May 22, 1956 M. C. DAVIS ET AL 2,746,396
MOBILE CAMERA MOUNTING PLATFORM
Filed May 5, 1952 3 Sheets-Sheet 1
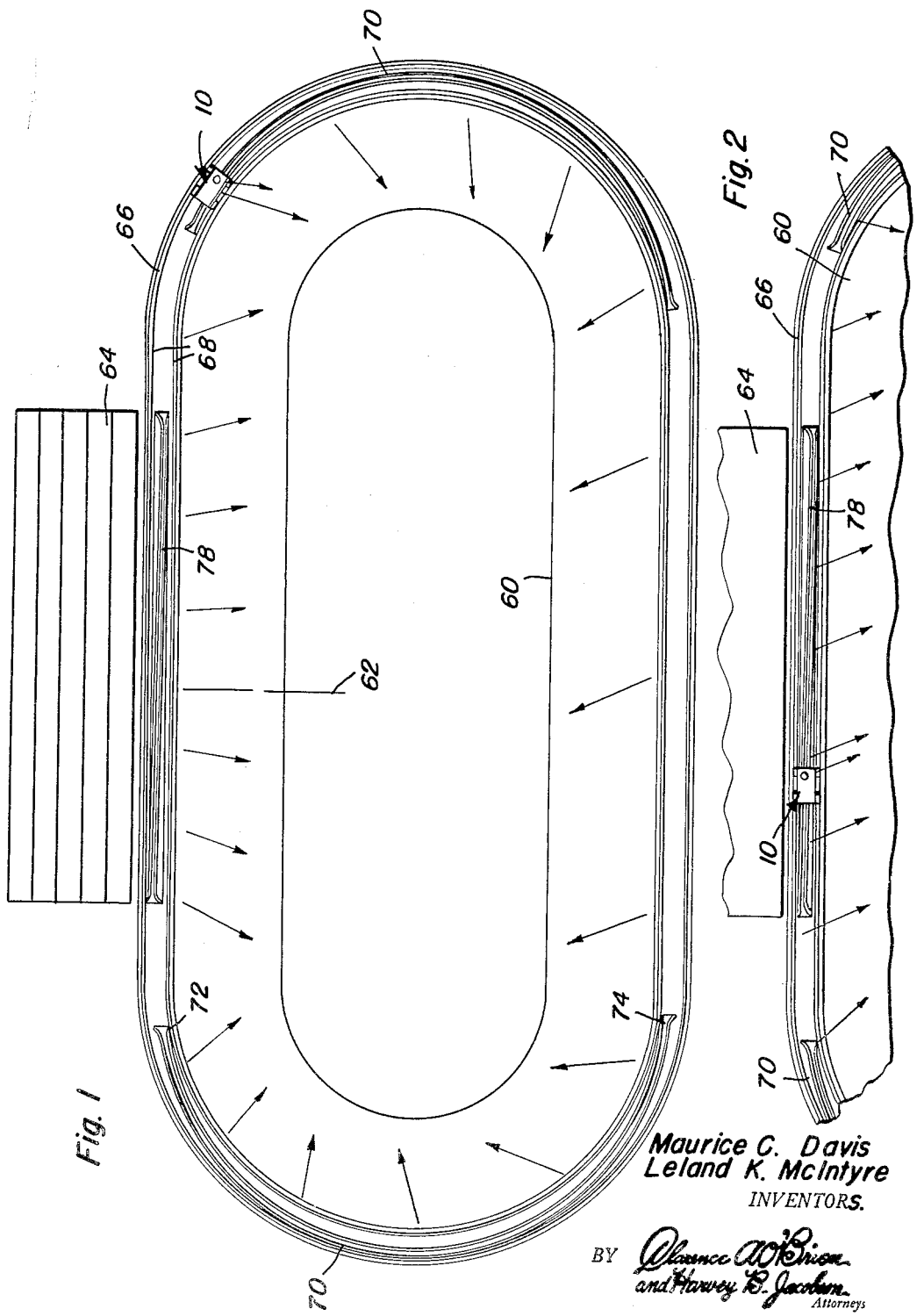
Maurice C. Davis
Leland K. McIntyre
INVENTORS.

May 22, 1956
M. C. DAVIS ET AL
2,746,396
MOBILE CAMERA MOUNTING PLATFORM
Filed May 5, 1952
3 Sheets-Sheet 2
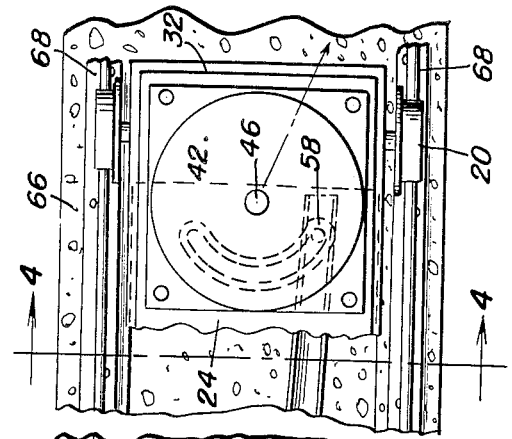
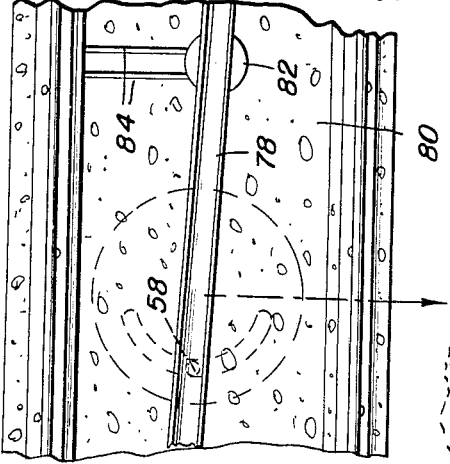
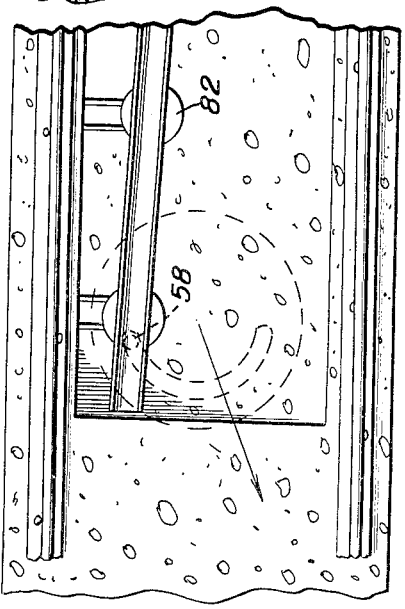
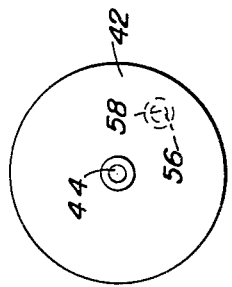
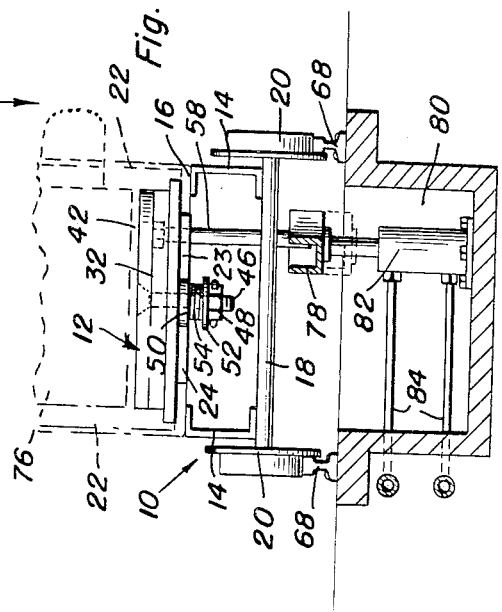
Maurice C. Davis
Leland K. McIntyre
INVENTORS.
BY *Clarence A. O'Brien*
*and Harvey B. Jackson*
Attorneys

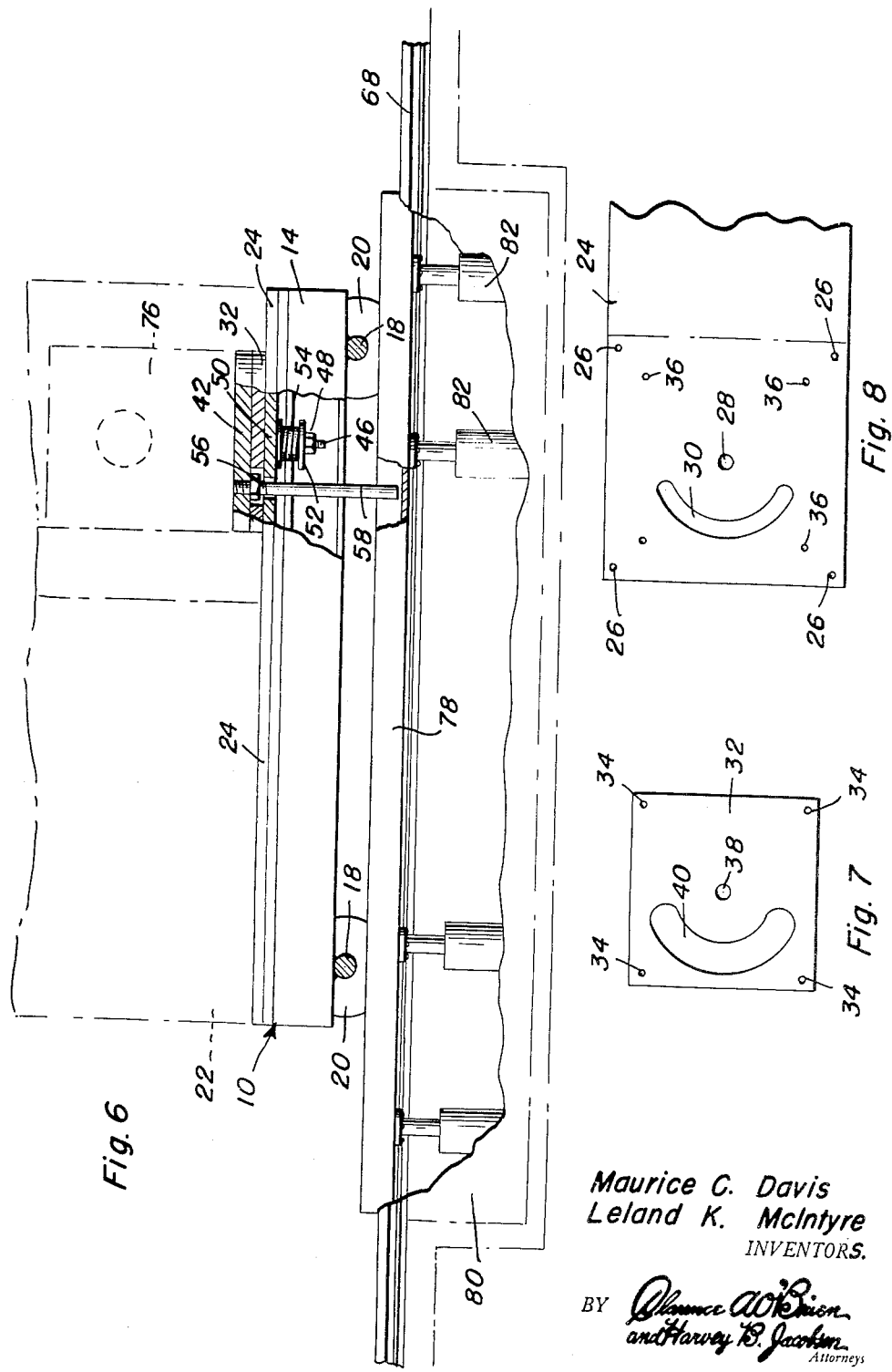

United States Patent Office 2,746,396
Patented May 22, 1956

2,746,396
MOBILE CAMERA MOUNTING PLATFORM

Maurice C. Davis and Leland K. McIntyre, San Francisco, Calif.

Application May 5, 1952, Serial No. 286,168

8 Claims. (Cl. 104—75)

This invention relates in general to camera mounting platforms, and more specifically to a camera mounting platform adapted to travel along an oval track around a race track.

The primary object of this invention is to provide an improved camera mounting platform which is mounted on a movable carriage for movement along a track, said platform permitting the rotation of a camera mounted thereon whereby pictures of contestants running along the race track may be photographed from the desired angle.

Another object of this invention is to provide an improved camera mounting platform which is mounted on a movable carriage for movement along a trackway, said camera mounting platform having an offset arm depending down through the bottom of said carriage for engagement with guide rails disposed between the rails of the trackway whereby the camera mounting platform and a camera mounted thereon may be rotated the correct amount at the desired location, said rotation being completely automatic.

Another object of this invention is to provide an improved camera mounting platform which is rotatable with respect to a base, said camera mounting platform being mounted on its base by a fastening means which retains the camera mounting platform in adjusted position, said camera mounting platform being associated with guideways disposed between the rails of a track on which the carriage carrying the camera mounting platform is disposed for automatically rotating the camera mounting platform.

A further object of this invention is to provide an improved guideway system for use in combination with a camera mounting platform having a depending arm for automatically rotating the same to the desired angle at the desired point along a track, said guideway extending at a slight angle to the longitudinal axis of the track and being mounted for selective engagement with the arm depending from the rotatable camera mounting platform.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a top plan view of a conventional race track having located adjacent thereto a continuous track which encircles the same, said track having mounted thereon a movable carriage provided with the camera mounting platform which is the subject of this invention, the line of sight of a camera mounted on a camera mounting platform being indicated by arrows, a vertically adjustable guideway associated with the camera mounting platform and disposed in front of the grandstand of the race track being in its position to rotate the camera mounting platform in a manner indicated by the arrows in front of the grandstand;

Figure 2 is a fragmentary top plan view of that portion of the race track in Figure 1 in front of the grandstand and showing the line of sight of the camera mounted on the camera mounting platform as it passes in front of the grandstand when the guideway is in its depressed position;

Figure 3 is an enlarged fragmentary top plan view of the portion of the track in front of the grandstand and shows the general relationship of the selectable elevatable guideway associated therewith, the camera mounting platform being illustrated at one end of the guideway in solid lines and the various positions thereof as it travels along the track over the guideway being shown by dotted lines, the track and guideway having portions thereof broken away and omitted;

Figure 4 is a transverse vertical sectional view taken substantially upon the plane indicated by the section line 4—4 of Figure 3 and showing the general relationship of the track, the guideway and the bottom portion of a carriage on which said camera mounting platform is carried, the general outline of a camera and the sides of the carriage being shown in dotted lines;

Figure 5 is a top plan view of the camera mounting platform and shows the details thereof;

Figure 6 is an enlarged side elevational view of a section of the track in front of the grandstand of the race track and shows the relationship of the carriage mounted thereon and the guide rail extending upwardly in its raised position, portions of the guideway pit and carriage being broken away in order to show the details of the guideway and its relationship to the camera mounting platform;

Figure 7 is a top plan view of an adjusting guide plate adapted to be disposed beneath the camera mounting platform and shows the details thereof; and Figure 8 is a top plan view of a base plate which is intended to be secured to the frame of the carriage and support both the adjusting guide plate and the camera mounting platform.

Similar characters of reference designate similar or identical elements and portions throughout the specification and throughout the different views of the drawings.

Referring now to the drawings in detail, it will be seen that illustrated in Figures 4 and 6 is a carriage, which is referred to in general by the reference numeral 10, on which the camera mounting assembly, which is referred to in general by the reference numeral 12, is supported. The carriage 10 includes a pair of longitudinally extending frame rails 14 which are in the form of channel members with webs extending vertically. The frame rails 14 are connected together by a flat bed 16 which forms the bottom of the carriage 10. Extending transversely of the frame rails 14 and connected thereto for rotation are axles 18 on which are mounted track engagement wheels 20. Extending upwardly from the bed 16 are sides 22 which may be of any configuration and are intended merely to enclose the mechanism carried by the carriage 10.

The bed 16 is provided with a rectangular opening 23 therethrough adjacent one end of the carriage 10 over which is mounted a base plate 24. As is best illustrated in Figure 8, the base plate 24 is generally rectangular in outline and is provided with apertures 26 therethrough which are adapted to receive fasteners for securing the same to bed 16. Located centrally of the apertures 26 and along the longitudinal axis of the base plate 24 is a large aperture 28. The base plate 24 is also provided with an arcuate slot 30 adjacent one end thereof and symmetrical with the longitudinal axis thereof. The arcuate slot 30 is adjacent the central aperture 28 and is of a constant radius with the center of the aperture 28 as its center.

Mounted above and overlying one end of the base plate 24 is an adjusting guide plate 32 which is best illustrated in Figure 7. The adjusting guide plate 32 is generally square in outline and is provided with apertures 34 at each corner thereof. The apertures 34 are intended to be aligned with apertures 26 in the base plate 24 and the adjusting guide plate 32 secured to the base plate 24 by fasteners. The adjusting guide plate 32 is provided with a centrally located enlarged aperture 38 which is adapted to be aligned with the centrally located aperture 28 of the base plate 24. The adjusting guide plate is also provided with an arcuate slot 40 which is adapted to be aligned with the slot 30 in the base plate 24, the arcuate slot 40 being of a much greater width than the arcuate slot 30.

Overlying the adjusting base plate 32 is the camera mounting platform 42 which is best illustrated in Figure 5. The camera mounting platform 42 is circular in outline and is provided with a countersunk centrally located aperture 44 of the same size as the centrally located apertures 28 and 38 of the base plate 24 and the adjusting guide plate 32, respectively. Passing downwardly through the apertures 44, 38 and 28 is an elongated fastener 46 which is countersunk at its upper end in the countersunk aperture 44 and has a nut 48 adjustably threadedly engaged on the lower end thereof. In order that movement of the camera mounting plate 42 with respect to the adjusting guide plate 32 be permissible, the fastener 46 is provided with an upper washer 50 which engages the under side of the base plate 24 and the lower washer 52 which engages the upper surface of the nut 48. Disposed between the washers 50 and 52 is a coil spring 54 which is compressed by the action of the nut 48 to resiliently clamp the camera mounting plate 42 against the adjusting guide plate 32 while at the same time permitting rotation thereof.

Threadedly engaged in a nut 56 carried by the underside of the camera mounting plate 42 and offset from the center thereof is a downwardly projecting guide rod 58. The guide rod 58 passes through the arcuate slots 30 and 40 with the nut 56 disposed within the arcuate slot 40. The guide rod 58 is adapted to engage in a guideway which is adapted to move said guideway transversely of the longitudinal axis of the carriage 10.

Referring now to Figures 1 and 2 in particular, it will be seen that there is illustrated a conventional race track 60 which is provided with straight portions and curved portions, said race track having a finish line 62 which is in alignment with a grandstand 64 disposed adjacent one of the straightaways. Adjacent the race track 60 and encircling the same is a track 66 which includes a pair of spaced parallel rails 68 on which the wheels 20 of the carriage 10 are mounted. It will be noted that the track 66 is also provided with straight portions and curved portions, and guideways 70 mounted between the rails 68 of the track 66 along the entire length of the curves. The guideways 70 are identical in outline and are provided with flared entrance and exit openings 72 and 74, respectively. It will be noted that the position of the guideway 70 with respect to the center line of the track 66 varies as it progresses around its associated curve. As the carriage 10 moves along the straightaway of the track 66 and into one of the curves, the downwardly projecting guide rod 58 passes into the flared entrance opening 72 of one of the guideways 70 with the result that the guide rod 58 is gradually moved transversely of the longitudinal axis of the track 66 and the angle of the camera sight line with respect to the race track gradually varies as indicated by the arrows in Figures 1 and 2. As the carriage 10 enters the straight portion of the track 66 the camera mounting plate 42 is rotated to a predetermined angle and remains at that angle the full length of the straight portion as indicated by the parallel arrows. The process is repeated as the carriage 10 moves from the straight portion into the curved portion and then back into the straight portion of the track 66.

While the fixed guideway 70 at the curved ends of the track 66 permits the camera 76 mounted on the camera mounting plate 42 to be ahead of the contestants running on the race track and taking a picture looking at the contestants as they approach the camera, the arrangement does not permit the camera 76 to accurately show the relative positions of the contestants as they pass the finish line 62. It is, therefore, desirable to provide a novel guide means which would accomplish this result. Therefore, the track 66 has been provided with a guideway 78 between its rails 68 in front of the grandstand 64.

Referring now to Figure 3 in particular, it will be seen that the straight portion of the track 66 in front of the grandstand 64 is provided with a pit 80 in which are mounted a plurality of hydraulic jacks 82 which are connected by hydraulic lines 84 to a common source of hydraulic fluid under pressure. Secured to the upper end of the hydraulic jacks 82 is the guide rail 78 which is generally U-shaped and extends diagonally, adjacent one rail 68 to a point adjacent the other rail 68. The guideway 78 is adapted to engage the lower end of the guide rod 58 in the same manner as does the guideways 70 in order to move the same transversely of longitudinal axis of the track 66 in order to rotate the camera mounting platform 42.

Referring once again to Figure 1, it will be seen that the guideway 78 is so arranged that when it is in its up position and in engagement with the guide rod 58, the camera mounting plate 42 is rotated in such a manner that the sight line of the camera 76 is gradually rotated clockwise so that it is perpendicular to the straight portion of the race track 60 when the carriage 10 is disposed at the finished line 62. Also, as the carriage 10 passes beyond the finish line 62 the sight line of the camera 76 continues to rotate so as to obtain pictures of the backs of the contestants as they pass by.

When a race is being run on the race track 60, the guideway 78 is normally in its down position, as illustrated in Figure 2, and the carriage 10 passes in front of the grandstand with the angle of the camera mounting plate 42 remaining constant, as indicated by the arrows in Figure 2. The carriage 10 then continues to encircle the race track in front of the contestants until the last lap of the race is being run at which time the guideway 72 is moved to its up position by the hydraulic jacks 82 which supports the same. The camera mounting platform 42 is then rotated in the manner indicated by the arrows in front of the grandstand on Figure 1.

It will be understood that the camera 76 may be any suitable type of motion picture camera or, if desired, may be a television camera. It will be understood that the carriage 10 will be provided with drive means associated with certain of the wheels 20 for propelling the same along the track 66. The drive means may be selectively controlled whereby the speed of the carriage 10 along the track 66 may be varied so that the camera assumes the desired position with respect to the contestants running on the race track 60. When the carriage 10 approaches the home stretch during a race, it will be leading the leading contestants as it enters the straightaway and will gradually be slowed up until it is brought to a halt at the finish line at the same time the contestants pass the finish line 62. Then the carriage 10 will be moved down along the track 66 in order to obtain a rear view of the contestants as they continue down the race track 60, pass the finish line and also pick up the contestants as they turn around to return to the finish line. It will be understood that the drive means for the carriage 10 is such that the carriage 10 may be propelled either forwardly or rearwardly.

In certain instances it may be desired to tilt the camera mounting platform 42 as it moves along the straight portion in front of the grandstand 64. When this is desired, the height of the lower end of the guide rod 58 is varied by either adjusting the same with respect to the camera mounting platform 42 or by varying the thickness of the adjustable guide plate 32. It will be understood that the height of the lower end of the guide rod 58 will be adjusted to a point whereby it becomes in engagement with the web of the U-shaped guideway 78 and slightly raised in order to slightly tilt the camera mounting platform 42. It will be noted that inasmuch as the camera mounting platform 42 is secured in place by the fastener 46 which has a coil spring 54 thereon, that such a tilting action of the camera mounting plate 42 is permitted.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. The combination of a track and a carriage movable therealong, said carriage having a rotatable platform adapted to have a camera mounted thereon, means for rotating said platform as said carriage moves along said track, said means including a guideway mounted between rails of said track, a depending rotatable arm carried by said platform engageable by said guideway and rotatable thereby in response to movement of the carriage, said guideway being mounted for vertical movement in opposite directions into and from engagement with said arm.

2. The combination of a track and a carriage movable therealong, said carriage having a rotatable platform adapted to have a camera mounted thereon, means for rotating said platform as said carriage moves along said track, said means including a guideway mounted between rails of said track, a depending rotatable arm carried by said platform engageable by said guideway and rotatable thereby in response to movement of the carriage, said guideway being mounted for vertical movement in opposite directions into and from engagement with said arm, said guideway being mounted on hydraulic jacks for vertical movement thereby.

3. The combination of a track and a carriage movable therealong, said carriage having a rotatable platform adapted to have a camera mounted thereon, means for rotating said platform as said carriage moves along said track, said carriage including a bottom, an opening in said bottom, a base plate secured to said bottom and overlying said opening, an arcuate slot in said base plate concentric to the axis of rotation of said platform, said platform overlying said base plate and rotatable about a vertical fastener extending through said base plate, said means including a guideway mounted between rails of said track, a depending arm carried by said platform engageable with said guideway and rotatable thereby in response to movement of said carriage.

4. The combination of a track and a carriage movable therealong, said carriage having a rotatable platform adapted to have a camera mounted thereon, means for rotating said platform as said carriage moves along said track, said carriage including a bottom, an opening in said bottom, a base plate secured to said bottom and overlying said opening, a centrally located aperture in said base plate, an arcuate slot in said base plate, said arcuate slot having the center of said aperture as its center, said platform overlying said base plate and rotatable about a vertical fastener extending through said aperture, said means including a guideway mounted between rails of said track, a depending arm carried by said platform engageable with said guideway and rotatable thereby in response to movement of said carriage, said arm extending through said arcuate slot and limited in movement by the ends thereof.

5. In combination with an oval race track, a continuous track adjacent said race track, a carriage movable therealong, said carriage having a rotatable platform adapted to have a camera mounted thereon, means for rotating said platform in response to movement of said carriage along said track, said means including a guideway mounted between rails of said track, a depending arm carried by said platform engageable with said guideway, said guideway being arcuate and mounted at one of the curves adjacent said race track for varying the relative position of said platform as the carriage passes around the curve.

6. The combination of claim 5 wherein said platform is positioned by said guideway for proper alignment as it moves down the straight portion of the track.

7. In combination with an oval race track, a continuous track adjacent said race track, a carriage movable therealong, said carriage having a rotatable platform adapted to have a camera mounted thereon, means for rotating said platform in response to movement of said carriage along said track, said means including a guideway mounted between rails of said track, a depending arm carried by said platform engageable with said guideway, said guideway being mounted in one straight portion of said track, said guideway being mounted for vertical movement whereby it may be selectively engaged with said depending arm.

8. In combination with a continuous race track having straight and curved portions, a continuous railway surrounding said track and having straight and curved portions following the straight and curved portions of said race track, a carriage movable along said railway, a horizontal platform surmounting said carriage, a camera fixed on said platform with its lens facing said race track, means mounting said platform on said carriage for rotation about a vertical axis, an arm depending from said platform between the rails of said railway for rotating said platform, and cam guides spaced around said railway between the rails thereof and engaged by said arm as said carriage moves along said platform, said guides coacting with said arm to rotate said platform into positions in which the axis of said lens traverses the straight and curved portions of said race track diagonally.

References Cited in the file of this patent

UNITED STATES PATENTS

| | | |
|---|---|---|
| 1,730,519 | McKee | Oct. 8, 1929 |
| 2,348,841 | Oswald | May 16, 1944 |
| 2,400,455 | Donaldson | May 14, 1946 |
| 2,508,487 | Bonnet | May 23, 1950 |
| 2,590,389 | Doyle | Mar. 25, 1952 |